(12) United States Patent
Zlotnik et al.

(10) Patent No.: US 12,461,668 B2
(45) Date of Patent: Nov. 4, 2025

(54) SCHEME FOR DATA ENTRY INSERTION IN A SPARSELY POPULATED DATA STRUCTURE

(71) Applicant: Micron Technology, Inc., Boise, ID (US)

(72) Inventors: Leon Zlotnik, Camino, CA (US); Brian Toronyi, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 19 days.

(21) Appl. No.: 18/431,743

(22) Filed: Feb. 2, 2024

(65) Prior Publication Data

US 2024/0272811 A1 Aug. 15, 2024

Related U.S. Application Data

(60) Provisional application No. 63/444,462, filed on Feb. 9, 2023.

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0659; G06F 3/0679
See application file for complete search history.

(56) References Cited

U.S. PATENT DOCUMENTS

| 7,895,216 | B2 | 2/2011 | Longshaw et al. |
| 9,195,622 | B1* | 11/2015 | Roitshtein ................. G06F 3/06 |
| 11,403,275 | B2 | 8/2022 | Yan et al. |
| 12,067,275 | B1* | 8/2024 | Nassar .................. G06F 3/0679 |
| 2007/0260614 | A1* | 11/2007 | Bray ...................... G06F 16/235 |
| 2012/0170580 | A1* | 7/2012 | Jagannathan ........... H04L 45/54 |
|  |  |  | 370/392 |
| 2012/0191919 | A1* | 7/2012 | Sundstrom .......... G06F 12/0223 |
|  |  |  | 711/E12.024 |
| 2017/0285984 | A1* | 10/2017 | Matthews ............. G06F 3/0619 |
| 2020/0218458 | A1* | 7/2020 | Mulani ................. G06F 3/0611 |

* cited by examiner

*Primary Examiner* — Tracy A Warren
(74) *Attorney, Agent, or Firm* — Brooks, Cameron & Huebsch, PLLC

(57) ABSTRACT

A plurality of data entries are written in a first memory bank that comprises a portion of a data structure that is stored across a plurality of memory banks. For a subsequent data entry, a determination is made that the subsequent data entry has a value that is greater than a first data entry among the plurality of data entries in the first memory bank and less than a second data entry among the plurality of data entries in the first memory bank. The subsequent data entry is written to an address location in a second memory bank of the plurality of memory banks that is between a lowermost address location and an uppermost address location of the second memory bank and a first bit corresponding to the address location in the second memory bank to which the subsequent data entry was written is stored in the data structure.

20 Claims, 10 Drawing Sheets

|  | MEMORY BANK_3 | MEMORY BANK_2 | MEMORY BANK_1 | MEMORY BANK_0 | INDICATOR |
|---|---|---|---|---|---|
| 324-1 |  |  |  | 4$^{TH}$ ENTRY | 000 |
| 324-2 |  |  |  | 2$^{ND}$ ENTRY | 000 |
| 324-3 |  |  |  | 1$^{ST}$ ENTRY | 000 |
| 324-4 |  |  |  | 3$^{RD}$ ENTRY | 000 |
| 324-5 |  |  |  | 5$^{TH}$ ENTRY | 000 |

Columns: 316-3, 316-2, 316-1, 316-0, 317. Table 325.

*FIG. 3A*

|  | MEMORY BANK_3 | MEMORY BANK_2 | MEMORY BANK_1 | MEMORY BANK_0 | INDICATOR |
|---|---|---|---|---|---|
| 324-1 |  |  |  | 4$^{TH}$ ENTRY | 000 |
| 324-2 |  |  |  | 2$^{ND}$ ENTRY | 000 |
| 324-3 |  |  |  | 1$^{ST}$ ENTRY | 000 |
| 324-4 |  | 6$^{th}$ ENTRY |  | 3$^{RD}$ ENTRY | 010 |
| 324-5 |  |  |  | 5$^{TH}$ ENTRY | 000 |

Columns: 316-3, 316-2, 316-1, 316-0, 317. Table 325.

*FIG. 3B*

| | MEMORY BANK_3 | MEMORY BANK_2 | MEMORY BANK_1 | MEMORY BANK_0 | INDICATOR |
|---|---|---|---|---|---|
| 324-1 | | | | 4TH ENTRY | 000 |
| 324-2 | | | | 2ND ENTRY | 000 |
| 324-3 | | | | 1ST ENTRY | 000 |
| 324-4 | | 6TH ENTRY | | 3RD ENTRY | 010 |
| 324-5 | | | | 5TH ENTRY | 000 |
| 324-6 | | | | 7TH ENTRY | 000 |

*FIG. 3C*

| | MEMORY BANK_3 | MEMORY BANK_2 | MEMORY BANK_1 | MEMORY BANK_0 | INDICATOR |
|---|---|---|---|---|---|
| 324-1 | | | | 4TH ENTRY | 000 |
| 324-2 | | | | 2ND ENTRY | 000 |
| 324-3 | | | | 1ST ENTRY | 000 |
| 324-4 | 9TH ENTRY | 6TH ENTRY | 8TH ENTRY | 3RD ENTRY | 111 |
| 324-5 | | | | 5TH ENTRY | 000 |
| 324-6 | | | | 7TH ENTRY | 000 |

*FIG. 3D*

| | 316-3 | 316-2 | 316-1 | 316-0 | 317 |
|---|---|---|---|---|---|
| | MEMORY BANK_3 | MEMORY BANK_2 | MEMORY BANK_1 | MEMORY BANK_0 | INDICATOR |
| 324-1 | | | | 4TH ENTRY | 000 |
| 324-2 | | | | 2ND ENTRY | 000 |
| 324-3 | | | | 1ST ENTRY | 000 |
| 324-4 | 9TH ENTRY | 6TH ENTRY | 8TH ENTRY | 3RD ENTRY | 111 |
| 324-5 | | 5TH ENTRY | | 10TH ENTRY | 010 |
| 324-6 | | | | 7TH ENTRY | 000 |

*FIG. 3E*

| | 316-3 | 316-2 | 316-1 | 316-0 | 317 |
|---|---|---|---|---|---|
| | MEMORY BANK_3 | MEMORY BANK_2 | MEMORY BANK_1 | MEMORY BANK_0 | INDICATOR |
| 324-1 | | | | 4TH ENTRY | 000 |
| 324-2 | | | | 2ND ENTRY | 000 |
| 324-3 | | 1ST ENTRY | | 11TH ENTRY | 010 |
| 324-4 | 9TH ENTRY | 6TH ENTRY | 8TH ENTRY | 3RD ENTRY | 111 |
| 324-5 | | 5TH ENTRY | | 10TH ENTRY | 010 |
| 324-6 | | | | 7TH ENTRY | 000 |

*FIG. 3F*

| | 316-3 MEMORY BANK_3 | 316-2 MEMORY BANK_2 | 316-1 MEMORY BANK_1 | 316-0 MEMORY BANK_0 | 317 INDICATOR |
|---|---|---|---|---|---|
| 324-1 | | | | 4TH ENTRY | 000 |
| 324-2 | | | | 2ND ENTRY | 000 |
| 324-3 | | 1ST ENTRY | | 11TH ENTRY | 010 |
| 324-4 | 9TH ENTRY | 6TH ENTRY | 8TH ENTRY | 3RD ENTRY | 111 |
| 324-5 | | 5TH ENTRY | | 10TH ENTRY | 010 |
| 324-6 | | 7TH ENTRY | | 12TH ENTRY | 010 |

| | 316-3 MEMORY BANK_3 | 316-2 MEMORY BANK_2 | 316-1 MEMORY BANK_1 | 316-0 MEMORY BANK_0 | 317 INDICATOR |
|---|---|---|---|---|---|
| 324-1 | 4TH ENTRY | 2ND ENTRY | 1ST ENTRY | 11TH ENTRY | 111 |
| 324-2 | 9TH ENTRY | 6TH ENTRY | 8TH ENTRY | 3RD ENTRY | 111 |
| 324-3 | 5TH ENTRY | 10TH ENTRY | 7TH ENTRY | 12TH ENTRY | 111 |
| 324-4 | | | | | 000 |
| 324-5 | | | | | 000 |
| 324-6 | | | | | 000 |

SCHEME FOR DATA ENTRY INSERTION IN A SPARSELY POPULATED DATA STRUCTURE

PRIORITY INFORMATION

This application claims the benefit of U.S. Provisional Application No. 63/444,462, filed on Feb. 9, 2023, the contents of which are incorporated herein by reference.

TECHNICAL FIELD

Embodiments of the disclosure relate generally to digital logic circuits, and more specifically, relate to a scheme for data entry insertion in a sparsely populated data structure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 3A-3H illustrate an example of a series of operations that can be performed in connection with a scheme for data entry insertion in a sparsely populated data structure in accordance with some embodiments of the present disclosure.

DETAILED DESCRIPTION

Figure 1:
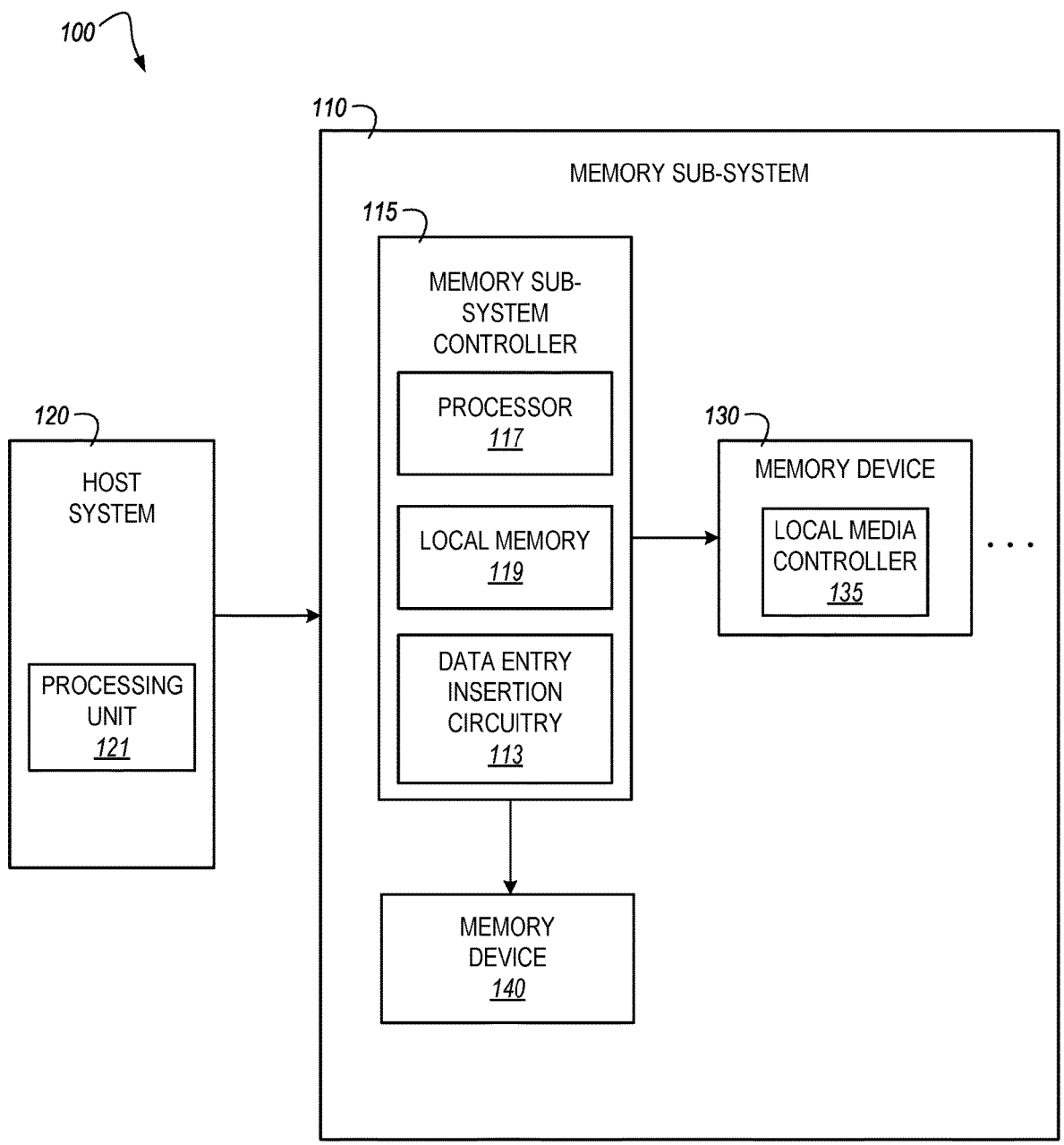
FIG. 1 illustrates an example computing system that includes a memory sub-system in accordance with some embodiments of the present disclosure.

Aspects of the present disclosure are directed to a scheme for data entry insertion in a sparsely populated data structure and, in particular to memory sub-systems that include circuitry (e.g., data entry insertion circuitry) to implement a scheme for data entry insertion in a sparsely populated data structure. The data structure can be stored within one or more memory resources that are associated with the memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation, data is written to, and retrieved from the memory sub-system. Some data are written to persistent (e.g., non-volatile) memory devices within the memory sub-system for long-term storage, while other data are written to non-persistent (e.g., volatile) memory devices within the memory sub-system for quick, short-term retrieval. Still other data are written to various memory resources and/or caches of the memory sub-system to assist with performance of operations involving the memory sub-system. For example, various memory resources and/or caches can be utilized during operation of the memory sub-system to provide read caching, write-through caching, write-back caching, and/or write-around caching. In addition, some memory resources and/or caches of the memory sub-system can be allocated to store various tables that are utilized during operation of the memory sub-system. One such example is a logical-to-physical (L2P) table that is used to map logical addresses utilized by a host system to physical addresses of the memory sub-system where data is physically stored. Another such example is a database containing an organized collection of data that is stored within the memory resource and/or cache.

In conventional approaches, when data is written to such memory resources and/or caches, the data is generally written sequentially (e.g., in an ascending or descending order) to physical addresses of the memory resource and/or cache in the order in which the data is received. For example, if a vector of data entries [51, 7, 300, 12, 3] is to be written to a memory resource and/or cache, the first data entry (51) is generally written to a first physical address (or "zeroth address location") of the memory resource and/or cache in the event that the data is ordered in an ascending manner. When the second data entry (7) is written to the memory resource and/or cache, the first data entry (51) is shifted to a second physical address (or "first address location") of the memory resource and/or cache, and the second data entry (7) can be written to the first physical address (or "zeroth address location") of the memory resource and/or cache. When the third data entry (300) is written to the memory resource and/or cache, the first data entry (51) can be shifted to a third physical address (or "second address location") of the memory resource and/or cache, the second data entry (7) can be shifted to the second physical address (or "first address location") of the memory resource and/or cache, and the third data entry (300) can be written to the first physical address (or "zeroth address location") of the memory resource and/or cache. This pattern may be repeated for the remaining data entries (e.g., the fourth data entry (12) and the fifth data entry (7), in this particular example).

It is noted that the above example is utilized in approaches in which the data is not required to be ordered. In conventional approaches in which the data is ordered as it is written to the memory resource and/or cache, the following example is illustrative. Considering the same vector of data entries [51, 7, 300, 12, 3], the first data entry (51) is generally written to a first physical address (or "zeroth address location") of the memory resource and/or cache. When the second data entry (7) is written to the memory resource and/or cache, the first data entry (51) can be shifted to a second physical address (or "first address location") of the memory resource and/or cache, and the second data entry (7)

can be written to the first physical address (or "zeroth address location") of the memory resource and/or cache.

Continuing with this example, because the third data entry (300) is larger (e.g., has a greater numerical value) than the first data entry and the second data entry, the third data entry is written to the third physical address (or "second address location") of the memory resource and/or cache. Now, the fourth data entry (12) is less (e.g., has a lower numerical value) than the first data entry (51) and the third data entry (300) but is larger than the second data entry (7), the first data entry (51) and the third data entry (300) are shifted to a third physical address (or "second address location") and a fourth physical address (or "third address location"), respectively, and the fourth data entry (12) is written to the second physical address (or "first address location") of the memory resource and/or cache. Finally, because the fifth data entry (3) is less than the first through fourth data entries, each of the first data entry through the fourth data entry are shifted one address location up (e.g., the third data entry (300) is shifted to a fifth physical address (or "fourth address location"), the first data value (51) is shifted to the fourth physical address (or "third address location"), the fourth data value (12) is shifted to the third physical address (or "second address location"), and the second data value (7) is shifted to the second physical address (or "first address location"). Finally, the fifth data value (3) is written to the first physical address (or "zeroth address location). Accordingly, a final order of the data entries in this approach is allocated such that the data entries are organized in an ascending order. It will be appreciated that the final order of the data entries in this approach can be organized in a descending order using similar operations to those described above.

As will be appreciated, the repeated shifts in the above examples require multiple reads, writes, overwrites, and rewrites of the data entries to maintain the data entries in a data structure within the memory resource(s) and/or cache(s), particularly when the data entries are maintained in an ordered (e.g., ascending or descending order based on the numerical values of the data entries) manner. These shifts and hence the reads and writes of the data entries can become costly in terms of computing resource overhead (e.g., power, time, bandwidth, etc.) and can therefore reduce the overall performance of a computing system in which such methodologies are employed.

Aspects of the present disclosure address the above and other deficiencies by writing data (e.g., data entries) to a data structure in a memory resource and/or cache. In the interest of clarity, embodiments herein will be generally described in relation to writing data to a data structure (e.g., a center allocation data structure) in a memory resource, however, it will be appreciated that embodiments in which a cache is utilized are contemplated within the scope of the disclosure.

In some embodiments, as described in more detail herein, the data structure can be a "center allocation" data structure. As used herein, a "center allocation data structure" is a data structure and/or technique for writing data to a data structure in which the first data entry is written to an address location in the memory resource that is between a first physical address (e.g., a "zeroth address location) of the memory resource and a last physical address (e.g., an $N^{th}$ address location, where N is the total quantity of address locations in the memory resource) of the memory resource. In some embodiments, the first data entry can be written to an address location that is substantially physically equidistant from the first physical address of the memory resource and the last physical address of the memory resource. That is, in some embodiments, the first data entry can be written to an address location that is in the middle of the memory resource with respect to the physical address spaces of the memory resource.

As used herein, the term "substantially" intends that the characteristic need not be absolute but is close enough so as to achieve the advantages of the characteristic. For example, "substantially equidistant" is not limited to a condition in which the address location that is substantially equidistant from the first physical address of the memory resource and the last physical address of the memory resource is absolutely equidistant from the first physical address of the memory resource and the last physical address of the memory resource but is equidistant from the first physical address of the memory resource and the last physical address of the memory resource within manufacturing limitations, operational conditions, etc. to achieve the characteristics of being "equidistant" from the first physical address of the memory resource and the last physical address of the memory resource. For example, if there are an even number of physical address locations in the memory resource, a physical address location that is substantially equidistant from the first physical address of the memory resource and the last physical address of the memory resource may not be at the exact physical center of the physical address locations but may be substantially equidistant such that components of the apparatus function as if said characteristics are the same or equal. It is further contemplated, however, that such characteristics may be exactly the same or exactly equal given the context of the disclosure.

Embodiments are not limited to the utilization of a "center allocation data structure" (or data structures), and other data structures and/or technique for writing data to data structures are contemplated within the scope of the disclosure. For example, the data structures described herein can be written sequentially to the data structure, as described above, e.g., in an ascending or descending order to physical addresses of the memory resource and/or cache in the order in which the data is received, or in other orders or techniques, such as by writing the data to in an "off-center" allocation approach where a first data entry is written to the data structure at a physical address location that is neither the first physical address location nor the last physical address location, but is also not substantially equidistant from the first physical address of the memory resource and the last physical address of the memory resource, by writing the data entries to the data structure on a random basis, or any other suitable technique for writing data entries to a data structure. Subsequent data entries in these embodiments can be written based on the values of such subsequent data entries (e.g., such that data structure is maintained as an ordered data structure) or on an ad hoc basis, or any other paradigm.

In the case of a center allocation data structure, in order to maintain an ordered (ascending) data structure in the memory resource, a second data entry can be written to an address location in the memory resource that is between the first physical address and the address at which the first data entry is written to if the second data entry has a value that is less than the value of the first data entry or the second data entry can be written to an address location in the memory resource that is between the last physical address and the address at which the first data entry is written to if the second data entry has a value that is greater than the value of the first data entry. It will be appreciated that, in order to maintain an ordered (descending) data structure in the memory resource, the second data entry can be written to an address location in the memory resource that is between the first physical address and the address at which the first data entry is written to if the second data entry has a value that is greater than the value of the first data entry or the second data entry can be written to an address location in the memory resource that is between the last physical address and the address and the address at which the first data entry is written to if the second data entry has a value that is less than the value of the first data entry.

Stated alternatively, and as described in more detail herein, when subsequent data entries have values that are less than the values of previous entries, they are, for an ordered ascending data structure, written to addresses that are closer to the first physical address location in the memory device. Conversely, when subsequent data entries have values that are greater than the values of previous entries, they are, for an ordered ascending data structure, written to address that are closer to the last physical address location in the memory device. For an ordered descending data structure, when subsequent data entries have values that are less than the values of previous entries, they are written to address that are closer to the last physical address location in the memory device and when subsequent data entries have values that are greater than the values of previous entries, they are written to address that are closer to the first physical address location in the memory device.

In order to continue to maintain an ordered (ascending) data structure in the memory resource, a third data entry can be written to an address location in the memory resource that is between the address at which the second data value is written to and the first physical address of the memory resource if the third data entry has a value that is less than the value of the second data entry. If the value of the third data entry is between the value of the first data entry and the second data entry, the third data entry can be written to an address location that is between the address at which the first data value is written to and the address location at which the second data value is written to. If the third data entry has a value that is greater than the first data entry and the second data entry, the third data entry can be written to an address location in the memory resource that is between the last physical address and the address and the address at which the first data entry is written to. It will be appreciated that, in order to maintain an ordered (descending) data structure in the memory resource, the third data entry can be written to an address location in the memory resource that is between the first physical address and the address at which the second data entry is written to if the third data entry has a value that is greater than the value of the second data entry and the value of the first data entry and so on and so forth.

In some embodiments, the second data entry and/or the third data entry can be written to an address location that is immediately next to the address location at which the first data entry is written; however, embodiments are not so limited, and the second data entry and/or the third data entry can be written to any address location that is between the first physical address and the address at which the first data entry is written to or between the last physical address and the address at which the first data entry is written to.

As described in more detail herein, as the data structure is filled with data entries, each subsequent data entry can be written to the data structure in an address location based on the relative value of each data entry with respect to the values of previously written data entries. This can allow for a quantity of shift operations to keep the data structured in an ordered state to be reduced in comparison to the conventional approaches described above. Accordingly, by writing the data entries to the center allocation data structure in accordance with the present disclosure, performance (e.g., the overall functioning) of a computing system in which embodiments of the present disclosure operate can be improved in comparison to the conventional approaches described above at least because the quantity of costly shift operations required to maintain the data entries in the data structure can be reduced in comparison to such approaches.

In some embodiments, the data structure (e.g., the center allocation data structure) described above can be stored across multiple memory resources (or portions thereof) to provide a scheme for data entry insertion in a sparsely populated data structure. For example, a first memory bank can include a first portion of the data structure, a second memory bank can include a second portion of the data structure, and so on and so forth. As described in more detail herein, data entries can be written to address locations in a particular one of the memory banks (e.g., the first memory bank) until a data entry is received that has a value that falls between two data entries that are already written to the first memory bank at adjacent physical addresses.

In order to reduce performance of shift operations (e.g., to avoid shifting one of the data entries in the adjacent physical addresses to make room the data entry that has the value that falls therebetween), the received data entry that has the value that falls between the two data entries that are already written to the first memory bank at adjacent physical addresses is written to a different memory bank (e.g., a memory bank other than the first memory bank). In general, a bit (e.g., index) is written to the data structure to indicate which of the memory banks the data entry that has the value that falls between the two data entries that are already written to the first memory bank at adjacent physical addresses. These and other features of the disclosure allow for an improvement to a computing system or computing device in which such embodiments are deployed by, at minimum, providing a reduction in latency and/or power consumption in writing and retrieving data entries for a data structure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface or other suitable (non-physical) interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include data entry insertion circuitry 113. Although not shown in FIG. 1 so as to not obfuscate the drawings, the data entry insertion circuitry 113 can include various circuitry to facilitate aspects of the disclosure described herein. In some embodiments, the data entry insertion circuitry 113 can include special purpose circuitry in the form of an ASIC, FPGA, state machine, hardware processing device, and/or other logic circuitry that can allow the data entry insertion circuitry 113 to orchestrate and/or perform operations to write data (e.g., data entries) to a data structure of a memory resource (e.g., to a data structure that is stored across multiple memory banks) in accordance with the disclosure.

In some embodiments, the memory sub-system controller 115 includes at least a portion of the data entry insertion circuitry 113. For example, the memory sub-system controller 115 can include a processor 117 (processing device) configured to execute instructions stored in local memory 119 for performing the operations described herein. In some embodiments, the data entry insertion circuitry 113 is part of the host system 110, an application, or an operating system. The data entry insertion circuitry 113 can be resident on the memory sub-system 110 and/or the memory sub-system controller 115. As used herein, the term "resident on" refers to something that is physically located on a particular component. For example, the data entry insertion circuitry 113 being "resident on" the memory sub-system 110, for example, refers to a condition in which the hardware circuitry that comprises the data entry insertion circuitry 113 is physically located on the memory sub-system 110. The term "resident on" may be used interchangeably with other terms such as "deployed on" or "located on," herein.

Figure 2:
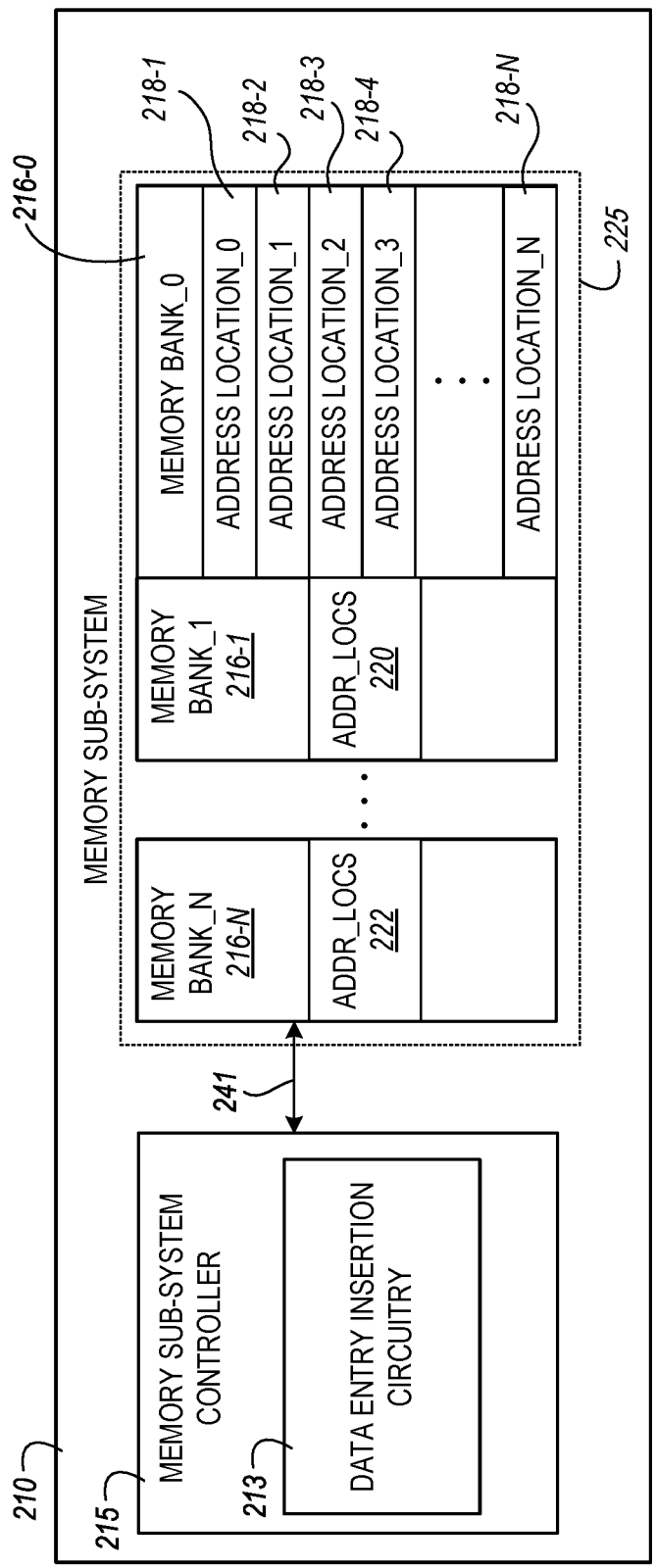
FIG. 2 illustrates an example memory sub-system in accordance with some embodiments of the present disclosure.

FIG. 2 illustrates an example memory sub-system 210 in accordance with some embodiments of the present disclosure. The example system, which can be referred to in the alternative as an "apparatus," includes a memory sub-system controller 215 and data entry insertion circuitry 213 (or "control circuitry" for brevity), which can be analogous to the memory sub-system controller 115 and the data entry insertion circuitry 113 illustrated in FIG. 1, herein. The memory sub-system 210 further includes a ("first") memory bank 216-0 that includes a plurality of address locations 218-1, 218-2, 218-3, 218-4 to 218-N (collectively referred to hereinafter as "address locations 218" of the "memory bank 216-0"). The memory sub-system 210 further includes a plurality of additional memory banks (i.e., the memory bank_1 216-1 to the memory bank_N 216-N) that each include respective pluralities of address locations (generically referred to for brevity in FIG. 2 as "ADDR_LOCS 218"). In some embodiments, the address locations 218 corresponding to the memory bank_0 216-0 can have a same respective physical address with respect to the address locations 218 of the memory banks 216-1 to 216-N. For example, if the ADDRESS LOCATION_2 218-3 of the memory bank_0 216-0 is the one hundredth physical address location starting from a lowest physical address location of the memory bank_0 216-0, the hundredth physical address location starting from a lowest physical address location of the memory bank_1 216-1 can be referred to as an ADDRESS LOCATION_2 of the memory bank_1 216-1 and so on and so forth.

As used herein, the term "memory bank" generally refers to a collection of physical memory locations that are addressable (e.g., have corresponding address locations associated therewith) and are provided either as independent memory chips and/or as part of a partitioned memory resource. In embodiments in which the memory banks are provided on independent chips, the memory banks can each comprise a memory array that includes rows and columns of memory cells. In embodiments in which the memory banks are provided as part of a partitioned memory resource, the memory resource can a single memory array that includes rows and columns of memory cells that are partitioned to create independently addressable portions of the memory array.

The address locations 218 can be physical address locations that correspond to one or more memory cells of the memory bank(s) 216-0 to 216-N. In some embodiments, two hundred and fifty-six (256) address locations 218, five hundred and twelve (512) address locations 218, etc. can be provided within each of the memory banks 216-0 to 261-N. It will be appreciated, however, that the memory bank(s) 216-0 to 216-N can include greater than or less than these enumerated quantities of address locations 218 based on the size, memory density, and/or architecture, among other factors of the memory banks 216-0 to 216-N and/or the memory sub-system 210. In some embodiments, the address locations 218 are logically addressable, for example, by the host system 120 illustrated in FIG. 1, herein.

The address locations 218 can be configured to store data entries in a data structure 225. As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure 225 can be configured to store a logical-to-physical (L2P) mapping table, a changelog, etc. although embodiments are not limited to these particular examples.

As shown in FIG. 2, the data structure 225 spans (e.g., is stored by) multiple memory banks, such as the memory banks 216-0 to 216-N. That is, in some embodiments, each of the memory banks 216-0 to 216-N can store a portion of the data structure 225. For example, if there are four memory banks 216, each of the four memory banks 216 can store one fourth (approximately 25%, based on other padding bits or metadata that may be stored as well) of the data structure 225. Embodiments are not so limited, and as described in more detail below, the data structure 225 can include additional information corresponding to bits (e.g., indicators and/or flags) that may serve as pointers to data entries written to the various memory banks 216 in accordance with the scheme for data entry insertion in a sparsely populated data structure. In addition to, or in the alternative, the data structure 225 can span the memory banks 216 such that one or more of the memory banks 216 stores a different percentage of the overall data structure 225.

The data structure 225 can be a "sparsely populated" data structure in accordance with some embodiments of the disclosure. As used herein, the term "sparsely populated" generally refers to a condition in which a greater quantity of physical address locations are made accessible to such a data structure 225 than may be required to store the entire data structure 225. For example, if a conventional data structure is expected to store 512 data entries, the memory bank 216-0 may include 512 address locations to accommodate these 512 data entries. In contrast, a "sparsely populated" data structure (e.g., the data structure 225) may include 2,048 address locations (e.g., in the case where there are four memory banks 216 that each include sufficient address locations to store 512 data entries) in order to provide additional address locations to allow for data entries to be written to different memory banks 216 that store different portions of the data structure 225 as described herein.

In FIG. 2, The ADDRESS LOCATION_0 218-1 can be referred to as a "first physical address," a "zeroth address location," or a "lowermost physical location" of the memory bank_0 216-0. The ADDRESS LOCATION_N 218-N can be referred to as a "last physical address," an "$N^{th}$ address location," or an "uppermost physical location" of the memory bank_0 216-0, herein. Although not explicitly shown in FIG. 2 so as to not obfuscate the layout of the drawings, the address locations (ADDR_LOCS 220 and ADDR_LOCS 222, etc.) shown in the memory banks_1 216-1 to 216-N can follow a similar convention.

As shown in FIG. 2, the memory bank(s) 216 are resident on the memory sub-system 210. In the example of FIG. 2, the memory bank(s) 216 can be resident on the memory sub-system 210 and not resident on any other component of the memory sub-system. Embodiments are not so limited and although not explicitly illustrated so as to not obfuscate the drawing layout, the memory bank(s) 216 can be resident (or partially-resident) on any component of the memory sub-system 210. For example, the memory sub-system 210 can be resident on the memory sub-system controller 215, the data entry insertion circuitry 213, the memory device 130, the local media controller 135, and/or the memory device 140 illustrated in FIG. 1.

In a non-limiting example, an apparatus (e.g., the memory sub-system 210) includes a plurality of memory banks 216-0 to 216-N and a processing device (e.g., the data entry insertion circuitry 213). The apparatus can be a system-on-chip, although embodiments are not so limited. In some embodiments, the plurality of memory banks 216-0 to 216-N can be configured to store a data structure 225. The processing device can write a plurality of data entries in a first memory bank (e.g., the memory bank 216-0) of the plurality of memory banks 216-0 to 216-N. The processing device can determine, for a subsequent data entry to be written to the data structure 225, that the subsequent data entry has a value corresponding thereto that is greater than a first particular data entry among the plurality of data entries written to the first memory bank 216-0 and less than a second particular data entry among the plurality of data entries written to the first memory bank 216-0. The processing device can write the subsequent data entry to an address location in a second memory bank (e.g., the memory bank 216-1, 216-N, etc. or the memory bank 316-2 in connection with the example of FIGS. 3A-3H) of the plurality of memory banks that is between a lowermost address location and an uppermost address location (e.g., is neither a lowermost address location nor an uppermost address location) of the second memory bank. In some embodiments, the processing device can store, in the data structure 225, a bit corresponding to the address location in the second memory bank to which the subsequent data entry was written. The bit can correspond to the indicator 317 illustrated and described in connection with FIGS. 3A-3H, herein. In at least one embodiment, the plurality of memory banks 216 comprises four memory banks (as shown in the non-limiting example of FIGS. 3A-3H) and each of the memory banks are configured to store at least 512 data entries.

Continuing with this non-limiting example, the processing device can write the subsequent data entry to the address location in the second memory bank of the plurality of memory banks, wherein the address location in the second bank corresponds to a same row address (e.g., within a same row 324 as discussed in connection with FIGS. 3A-3H) as a row address of the first particular data entry in the first memory bank or a same row address as a row address of the second particular data entry in the first memory bank.

In some embodiments, the processing device can determine, for a further subsequent data entry, that the further subsequent data entry has a value corresponding thereto that is greater than a data entry among the plurality of data entries in the first memory bank 216-0 and less than a value associated with the subsequent data entry. The processing device can then write the further subsequent data entry to an address location in a third memory bank (e.g., the memory bank 216-N, etc. or the memory bank 316-1 as described in connection with FIGS. 3A-3H, herein) of the plurality of memory banks that is in a row that spans the plurality of memory banks. In such examples, the data entry among the plurality of data entries in the first memory bank and the subsequent data entry are in the row that spans the plurality of memory banks. Responsive to writing the further subsequent data entry to the third memory bank, the processing device can store, in the data structure, a second bit (e.g., the indicator 317) corresponding to the address location in the third memory bank to which the further subsequent data entry was written.

Embodiments are not so limited, however, and in some embodiments, the processing device can determine, for a further subsequent data entry, that the further subsequent data entry has a value corresponding thereto that is less than a data entry among the plurality of data entries in the first memory bank and greater than a value associated with the subsequent data entry. The processing device can then write the further subsequent data entry to an address location in a fourth memory bank (e.g., the memory bank 216-N, etc. or the memory bank 316-3 as described in connection with FIGS. 3A-3H, herein) of the plurality of memory banks that is in a row that spans the plurality of memory banks. In such examples, the data entry among the plurality of data entries in the first memory bank and the subsequent data entry are in the row that spans the plurality of memory banks. Responsive to writing the further subsequent data entry to the third memory bank, the processing device can store, in the data structure, a second bit (e.g., the indicator 317) corresponding to the address location in the fourth memory bank to which the further subsequent data entry was written.

Continuing with this non-limiting example, the processing device can determine that the data structure 225 is "full" when a data entry is written to allocated address locations in one or more of the plurality of memory banks 216 and write data entries subsequent to determining that the data structure is "full" to at least one additional memory bank that was is separate from the plurality of memory banks. Embodiments are not so limited, however, and the processing device can determine that the data structure 225 is "full" when a data entry is written to a threshold quantity of address locations in one or more of the plurality of memory banks and write the data structure to a virtual memory area couplable to the plurality of memory banks. In yet other embodiments, the processing device can, in response to determining that the data structure 225 is "full" when a data entry is written to a threshold quantity of address locations in one or more of the plurality of memory banks 216, perform an operation to compact the data entries into a quantity of rows of the memory banks 216, as described below in connection with FIGS. 3A-3H. Accordingly, the data structure 225 can be determined to be "full" at point whether all of the address locations are occupied (e.g., contain data entries) or not. For example, the data structure 225 can be determined to be "full" based on a quantity of allocated addresses containing data entries, a quantity of address locations that do not contain data entries, a quantity of data entries being written to a particular bank, etc. However, in some embodiments, the data structure 225 may be determined to be "full" when there are at least some address locations that do not contain data entries.

As used herein, the term "compacting" and variants thereof generally refers to performance of operations to write, shift, or otherwise move data entries within the memory banks 216 such that there are a particular quantity of rows associated with the memory banks 216 that do not have data entries written thereto. For example, "compaction," as used herein can refer to an operation that removes or reduces the quantity of memory cells of the data structure 225 that do not have data entries allocated thereto. In some embodiments, "compaction" can be performed to ensure that data entries associated with the data structure 225 are contiguously address across or otherwise contiguously span across a same bank 216 and/or multiple banks 216 without (or with minimal) gaps therebetween. A further example of this concept is provided below in connection with FIG. 3H.

In another non-limiting example, an apparatus (e.g., the memory sub-system 210) includes a memory device (e.g., the memory device 130 and/or 140 illustrated in FIG. 1) that includes a plurality of memory banks 216-0 to 216-N and a processing device (e.g., the data entry insertion circuitry 213). In some embodiments, each memory bank among the plurality of memory banks 216 can be configured to store at least a portion of a data structure 225 that is stored across the plurality of memory banks 216. The apparatus can be a system-on-chip, although embodiments are not so limited.

The processing device can write a plurality of data entries in a first memory bank (e.g., the memory bank 216-0) that comprises the portion of the data structure 225 by: (1) writing a first data entry to the first memory bank in an address location that is between a lowermost address location and an uppermost address location of the first memory bank, (2) determining that a second data entry has a data value that is lower than a data value associated with the first data entry, and (3) writing the second data entry to an address location of the first memory bank that is between the address location to which the first data entry is written and the lowermost address location. In the alternative, the processing device can write a plurality of data entries in a first memory bank (e.g., the memory bank 216-0) that comprises the portion of the data structure 225 by: (1) determining that the second data entry has a data value that is greater than the data value associated with the first data entry and (2) writing the second data entry to an address location of the first memory bank that is between the address location to which the first data entry is written and the uppermost address location.

The processing device can then determine, for a subsequent data entry to be written to the data structure, that the subsequent data entry has a value corresponding thereto that is between the first data entry and the second data entry written to the first memory bank and write the subsequent data entry to an address location in a second memory bank (e.g., the memory bank 216-1 or the memory bank 316-2 in connection with the example of FIGS. 3A-3H) of the plurality of memory banks that is in a row that is a same row that spans the plurality of memory banks as the first data entry or the second data. In such embodiments, the processing device can further store, in the data structure 225, a bit corresponding to the address location in the second memory bank to which the subsequent data entry was written. As mentioned above, the bit can correspond to the indicator 317 discussed in connection with FIGS. 3A-3H, herein.

Continuing with this non-limiting example, the processing device can determine, for a further subsequent data entry, that the further subsequent data entry has a value corresponding thereto that is between the first data entry or the second data entry and subsequent data entry. The processing device can then write the further subsequent data entry to an address location in a third memory bank (e.g., the memory bank 316-3 or the memory bank 316-1 illustrated in FIGS. 3A-3H, herein) of the plurality of memory banks that is in the row that is the same row that spans the plurality of memory banks as the first data entry or the second data and the subsequent data entry. As described herein, the processing device can then store, in the data structure 225, a second bit (e.g., indicator 317) corresponding to the address location in the third memory bank to which the further subsequent data entry was written.

In some embodiments, the processing device can, as described above, write data entries to the data structure 225 such that the data entries are numerically ordered. In addition to, or in the alternative, the processing device can be configured to write the plurality of data entries and the subsequent data entry to the plurality of memory banks to reduce an amount of power consumed or a latency incurred within a system in which the apparatus is deployed, as discussed above.

Continuing this non-limiting example, the processing device can determine that the data structure is "full," (e.g., when a particular quantity of data entries are allocated in the data structure 225), as discussed above. The processing device can then perform an operation to compact the data entries written to the data structure 225 within the plurality of memory banks. For example, as discussed in connection with FIG. 3H, herein, the processing device can compact the entries in the data structure 225 such that the data entries are written to a particular quantity of rows (e.g., the rows 324 illustrated in FIGS. 3A-3H) across one or more (or at least a portion of) the memory banks 216 with zero (or minimal) empty address locations therebetween. The indicators 317 for each of these rows can be updated (as discussed below), and the processing device can assign the compacted data structure to a virtual bin (e.g., a sequence of virtual address locations accessible to the memory banks 216) and/or proceed to write new data entries to address locations within a data structure that does not include the address locations of the compacted data entries. In order to allow for new data entries to be written to the memory banks 216, the processing device can assign a new area in the memory bank(s) 216 to write subsequent data entries by relocating the bin boundaries (e.g., the bin boundaries 431-1 and/or 431-2 illustrated in FIG. 4 to indicate a new range of rows that will correspond to address locations for data entries.

FIGS. 3A-3H Illustrate an example of a series of operations that can be performed in connection with a scheme for data entry insertion in a sparsely populated data structure in accordance with some embodiments of the present disclosure. It will be appreciated that the operations shown in FIGS. 3A-3H are merely illustrative and are provided to assist in understanding embodiments of the disclosure. Accordingly, the operations shown in FIGS. 3A-3H are simplified and may be expanded to include additional operations, memory banks, rows, etc. in accordance with the disclosure.

As shown in FIG. 3A, a plurality of memory banks (MEMORY BANK_0 316-0, MEMORY BANK_1 316-1, MEMORY BANK_2 316-2, to MEMORY BANK_3 316-3, collectively referred to "MEMORY BANKS 316" or "memory banks 316") store at least a portion of a data structure 325. The memory bank 316 can be analogous to the memory banks 216 illustrated in FIG. 2 and the data structure 325 can be analogous to the data structure 225 illustrated in FIG. 2. The memory banks 316 can each include a plurality of respective rows 324-1, 324-2, 324-3, 324-4, to 324-5, etc., which can be referred to herein collectively as "rows 324." Although not explicitly show in in FIGS. 3A-3H, each row 324 of each of the memory banks 316 can correspond to an address location (e.g., the address locations 318, 320, 322, etc. shown in FIG. 2). In some embodiments, the row 324-1 can correspond to a row 324 that is associated with an upper pointer (e.g., the upper pointer 427 illustrated in FIG. 4) of the memory banks 316 and the row 324-5 can correspond to a row 324 that is associated with a lower pointer (e.g., the lower pointer 429 illustrated in FIG. 4). Embodiments are not so limited, however, and in some embodiments, the row 324-1 can correspond to a first physical address of each of the memory banks 316 and the and the row 324-5 can correspond to a last physical address of the memory banks 316.

The data structure 325 can also store an indicator 317 corresponding to the spare memory banks 316-1, 316-2, and 316-3 (it is noted that, in some embodiments, the data entries written to the zeroth memory bank 316-0 can be explicitly defined by an upper pointer and/or a lower pointer and therefore do not generally require an indicator 317 to be associated therewith). The indicator can include a series of bits (e.g., a bit pattern) that associates values of the series of bits with whether or not data entries are written to the memory banks 316-1, 316-2, 316-3, etc. For example, when the indicator has a value of "000" a data entry in that particular row 324 is only written in the memory bank 316-0 (provided that the upper and lower pointer are correspondingly set). If the indicator has a value of "100," a data entry in that particular row is written to the memory bank 316-3 as well as the memory bank 316-0. Moreover, if the indicator 317 has a value of "111," a data entry is written to the memory bank 316-3, 316-2, 316-1, and 316-0. Further examples of the indicator are provided below.

As shown in FIG. 3A, five (5) data entries ($1^{st}$ entry, $2^{nd}$ entry, $3^{rd}$ entry, $4^{th}$ entry, and $5^{th}$ entry) have been written to the memory bank 316-0 at respective address locations in the memory bank 316-0. In the non-limiting embodiment shown in FIGS. 3A-3H, the data entries have been written to the memory bank 316-0 in accordance with an allocation policy in which the $1^{st}$ entry is written to a center address location (e.g., the center pointer 425 illustrated in FIG. 4) in the memory bank 316-0, the $2^{nd}$ and $3^{rd}$ data entries have been written to address locations to either physical side of the address location in which the $1^{st}$ data entry was written, and the $4^{th}$ and $5^{th}$ data entries are written to address locations that are physically adjacent to the $2^{nd}$ and $3^{rd}$ data entries, respectively. Provided the portion of the data structure 325 that is written the memory bank 316-0 is organized in an ascending, ordered manner, the values of the data entries are given as follows: $4^{th}$ entry<$2^{nd}$ entry<$1^{st}$ entry<$3^{rd}$ entry<$5^{th}$ entry. However, as described above, embodiments are not limited to scenarios in which the portion of the data structure 325 that is written the memory bank 316-0 is organized in an ascending, ordered manner.

In FIG. 3B, a $6^{th}$ data entry (e.g., a "subsequent data entry") has been written to the data structure 325. The $6^{th}$ data entry is written in the memory bank 316-2 in an address location in row 324-4. For example, a determination is made that the $6^{th}$ data entry would require data to be shifted (e.g., an insertion) in the memory bank 316-0 if this data entry was written to the memory bank 316-0 (e.g., the $6^{th}$ data entry has a value between the value of the $1^{st}$ data entry and the $3^{rd}$ data entry) and, in order to avoid execution of a readmodify-write operation, the 6$^{th}$ data entry is instead written to the memory bank 316-2. In response to the 6$^{th}$ data entry being written in the memory bank 316-2 in an address location in row 324-4, the indicator 317 corresponding to this address location is inverted (e.g., from "000" to "010," as shown in FIG. 3B).

In FIG. 3C, a 7$^{th}$ data entry has been written to the data structure 325. The 7$^{th}$ data entry is written in the memory bank 316-0 in an address location in row 324-6. For example, a determination is made that the 7$^{th}$ data entry would not require data to be shifted in the memory bank 316-0 if this data entry was written to the memory bank 316-0 (e.g., the 7$^{th}$ data entry has a value that is greater than the of the 5$^{th}$ data entry) and can therefore be written to the memory bank 316-0 without requiring performance of a read-modify-write operation. It is noted that the indicator 317 in the example in FIG. 3C does not require update, so the value of the indicator associated with row 324-6 remains "000" and the lower pointer (e.g., the pointer 427) may be adjusted accordingly.

In FIG. 3D, an 8$^{th}$ data entry and a 9$^{th}$ data entry (e.g., "further subsequent data entries") have been written to the data structure 325. The 81 and 9$^{th}$ data entries are written in the memory bank 316-2 in an address location in row 324-4. For example, a determination is made that the 9$^{th}$ data entry has a value that is lesser than the 6$^{th}$ data entry and greater than the 1$^{st}$ data entry, and the 8$^{th}$ data entry has a value between the value of the 6$^{th}$ data entry and the 3$^{rd}$ data entry. Accordingly, in order to avoid performance of a read-modify-write operation, the 8$^{th}$ data entry and the 9$^{th}$ data entry are instead written to the memory bank 316-2. In response to the 8$^{th}$ data entry and the 9$^{th}$ data entry being written in the memory bank 316-2 in an address location in row 324-4, the indicator 317 corresponding to this address location is incremented (e.g., from "010" to "111," as shown in FIG. 3D).

In FIG. 3E, a 10$^{th}$ data entry has been written to the data structure 325. The 10$^{th}$ data entry is written to the memory bank 316-0 in the address location in the row 324-5. In order to accommodate the 10$^{th}$ data entry, the 5$^{th}$ data entry that was previously written to the memory bank 316-0 in the address location in the row 324-5 is shifted (re-written) to the address location in the memory bank 316-2 in the row 324-5. The 10$^{th}$ data entry may have a value that is greater than the value of the 5$^{th}$ data entry but is less than the value of the 7$^{th}$ data entry. Accordingly, by writing the 5$^{th}$ data entry to the memory bank 216-2 and writing the 10$^{th}$ data entry to the memory bank 316-0, shifting operations that can involve read-write-modify operations can be reduced in comparison to previous approaches. In response to the 5$^{th}$ data entry being written in the memory bank 316-2 in an address location in row 324-5, the indicator 317 corresponding to this address location is incremented (e.g., from "000" to "010," as shown in FIG. 3E).

In FIG. 3F, an 11$^{th}$ data entry has been written to the data structure 325. The 11$^{th}$ data entry is written to the memory bank 316-0 in the address location in the row 324-3. In order to accommodate the 11$^{th}$ data entry, the 11$^{th}$ data entry that was previously written to the memory bank 316-0 in the address location in the row 324-3 is shifted (re-written) to the address location in the memory bank 316-2 in the row 324-3. By writing the 1$^{st}$ data entry to the memory bank 316-2 and writing the 11$^{th}$ data entry to the memory bank 316-0, shifting operations that can involve read-write-modify operations can be reduced in comparison to previous approaches. In response to the 1$^{st}$ data entry being written in the memory bank 316-2 in an address location in row 324-3, the indicator 317 corresponding to this address location is incremented (e.g., from "000" to "010," as shown in FIG. 3F).

In FIG. 3G, a 12$^{th}$ data entry has been written to the data structure 325. In this example, we assume that the 7$^{th}$ data entry is written to a last physical address location in the data bank 316-0 such that there are no subsequent physical addresses available in the data bank 316-0. In order to accommodate the 12$^{th}$ data entry, the 7$^{th}$ data entry that was previously written to the memory bank 316-0 in the address location in the row 324-6 is shifted (re-written) to the address location in the memory bank 316-2 in the row 324-6. By writing the 7$^{th}$ data entry to the memory bank 316-2 and writing the 12$^{th}$ data entry to the memory bank 316-0, shifting operations that can involve read-write-modify operations can be reduced in comparison to previous approaches. In response to the 7$^{th}$ data entry being written in the memory bank 316-2 in an address location in row 324-6, the indicator 317 corresponding to this address location is incremented (e.g., from "000" to "010," as shown in FIG. 3G).

Several examples of shifting or moving data entries to accommodate a new data entry follow. In an example in which the row 324-4 is full, as shown in FIG. 3G, and a new data entry is to be written to the data structure 325 that has a value between the 6$^{th}$ entry and the 8$^{th}$ entry, the 11$^{th}$ data entry could be shifted to memory bank 316-1 in row 324-3, the 9$^{th}$ data entry could be shifted to the memory bank 316-0 in row 324-3, and the 6$^{th}$ data entry could be written to the memory bank 316-3 in row 324-4. In this example a total of three shifting operations are performed, which may generally be more efficient (at least in terms of power consumption, time, and/or bandwidth) than the contemporary approaches described above. In another example in which the row 324-4 is full, as shown in FIG. 3G, and a new data entry is to be written to the data structure 325 that has a value between the 6$^{th}$ entry and the 8$^{th}$ entry, the 3$^{rd}$ data entry could be shifted to the memory bank 316-3 in row 324-5, the 8$^{th}$ data entry could be shifted to the memory bank 316-0 in row 324-4. In this example a total of two shifting operations are performed, which may generally be more efficient (at least in terms of power consumption, time, and/or bandwidth) than the contemporary approaches described above.

Generally speaking, in the embodiments described herein, if there is not an available location in which to write a data entry while maintaining an ordering of the data entries, data entries that have been written to the data structure can be shifted in order to free a space in which to write such data entries without shifting every data entry in the data structure 325. That is, embodiments herein allow for a minimum (or near minimum) quantity of shifts to be performed to realize an empty space to write a new data entry to, in contrast to approaches that require all or most of the data entries to be shifted to accommodate a new data entry. At least because embodiments herein (e.g., utilization of the sparsely populated data structures described herein) can allow for a reduction in a total quantity of shifts in comparison to previous approaches in which entries may cause multiple data entries to be shifted each time a new entry is received, the embodiments of the present disclosure provided one or more improvements to the overall functioning of a computing device in which said embodiments operate or are provided. Stated alternatively, embodiments herein allow for data entries to be inserted into the data structure 325 without the need for moving each and every contiguous data entry as generally required by other approaches, as described above. Accordingly, the benefits of the embodiments described herein can improve the functioning of a computing device in which said embodiments operate or are provided.

In some embodiments, a direction to shift data to accommodate a new entry can be determined based on how far away a next entry is from a different particular entry. For example, a quantity of address locations from the center entry 424, the lower entry 428, and/or the upper entry 426 can be used to determine a direction which data can be shifted to accommodate a new entry. For example, if there are more data entries on one side (with respect to the center pointer 425), it may be beneficial to shift data entries toward the upper and/or lower pointers 427/429 to minimize the power, time, bandwidth, etc. consumed in performance of such shifts. For example, if there are more data entries having higher values, it may be beneficial to shift the written data values in a direction that has lower data values in the data structure 325, while if there are more data entries having lower values, it may be beneficial to shift the written data values in a direction that has higher data values in the data structure 325.

As a non-limiting example, to accommodate a new data entry, shifting two data entries toward a section of the data structure 325 that has more data entries may be less useful than shifting three data entries to a section of the data structure 325 that has more less entries and therefore it may be determined that the data should be shifted more times to accommodate the new entry. For example, if the data structure 325 has a greater quantity of entries below the pointer 425 and a new data entry arrives that is between data entries below the pointer 425, it can be determined that shifting data above the pointer 425 may be more beneficial. Conversely, if the data structure 325 has a greater quantity of entries above the pointer 425 and a new data entry arrives that is between data entries above the pointer 425, it can be determined that shifting data below the pointer 425 may be more beneficial even if a greater quantity of shifts are required to accommodate the new data entry.

In addition, or in the alternative, embodiments herein contemplate determining a quantity of entries (e.g., a quantity of address locations between the pointers 427 and 429 and/or between the bin boundaries 431-1 and 431-2) and determining which direction to shift previously written data entries when a new data entry is to be written based on the that are allocated for data entries. For example, if the data structure 325 has a greater quantity of available address locations that are available to be written to on one side of the pointer 425 and a new data entry arrives that is between data entries below the pointer 425, it can be determined that shifting data above the pointer 425 may be more beneficial, as mentioned, e.g., in connection with the non-limiting example above in which a new data entry is to be written to the data structure 325 that has a value between the $6^{th}$ entry and the $8^{th}$ entry and the previously written entries are shifted a particular direction accommodate the new data entry. Conversely, if the data structure 325 has a greater quantity of available address locations that are available to be written on the other side of the pointer 425 and a new data entry arrives that is between data entries above the pointer 425, it can be determined that shifting data below the pointer 425 may be more beneficial, as mentioned, e.g., in connection with the non-limiting example above in which a new data entry is to be written to the data structure 325 that has a value between the $6^{th}$ entry and the $8^{th}$ entry and the previously written entries are shifted a particular direction accommodate the new data entry.

FIG. 3H illustrates a scenario in which a particular quantity of data entries have been allocated within the data structure (e.g., 512 entries, etc.). Once this particular quantity of data entries have been allocated, the data entries can be compacted as shown in FIG. 3H (e.g., can be compacted into a "bin") that includes all the entries that were written to the sparsely populated data structure 325. This can then allow for subsequent operations to be performed in accordance with the disclosure to write subsequent data entries to the memory banks 316. Once all the data entries have been compacted as shown in FIG. 3H, the indicators 317 for each row 324 that includes data entries are updated to each have a value of "111" while the indicators 317 corresponding to the rows 324 that no longer contain data entries are updated to have a value of "000." Although described above as being organized from a lowest value (e.g., the $4^{th}$ entry) to a highest value (e.g., the $12^{th}$ entry), embodiments are not so limited, and the compacted bin can be organized from a highest value to a lowest value, among other possibilities.

Figure 4:
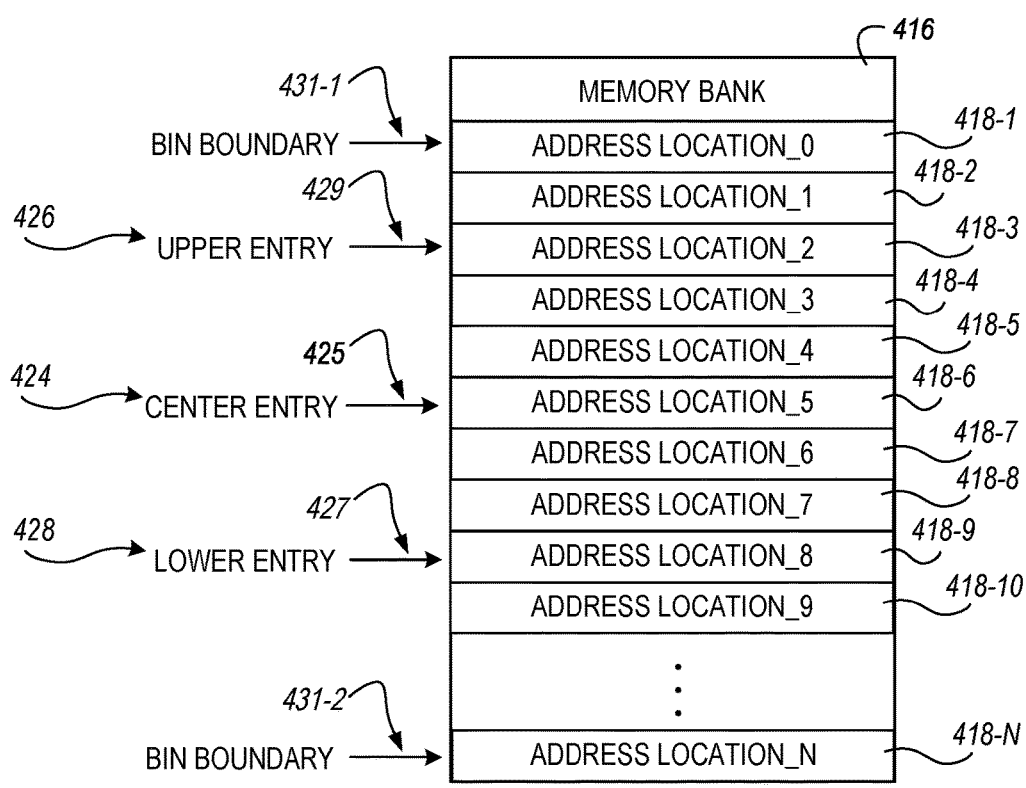
FIG. 4 illustrates an example of a memory resource having a plurality of address locations in accordance with some embodiments of the present disclosure.

FIG. 4 illustrates an example of a memory bank 416 having a plurality of address locations 418-1 to 418-N in accordance with some embodiments of the present disclosure. The memory bank 416 can be analogous to the memory banks 216/316 illustrated in FIG. 2 and FIGS. 3A-3H, herein, and the address locations can be analogous to the address locations 218 illustrated in FIG. 2, herein. In FIG. 4, a center entry 424, a lower entry 428, and an upper entry 426 are illustrated. Each of these entries corresponds to a data entry that has been written to the memory bank 416 and has a respective pointer 425, 427, and 429 associated therewith. In addition, a first bin boundary 431-1 and a second bin boundary 431-2 are illustrated in FIG. 4.

The upper pointer 429 and the lower pointer 427 can correspond to upper and lower bounds of data entries written to the memory bank 416. For example, there may be no data entries written to address locations 418 that are not between the upper pointer 429 and the lower pointer 427. In contrast, the first bin boundary 431-1 and the second bin boundary 431-2 can correspond to a first and last address location 418 of the memory bank 416 that are available for data entries to be written. The first bin boundary 431-1 and the second bin boundary 431-2 may not, however correspond to the actual first and last physical address locations of the memory bank 416 and instead, in some embodiments, can correspond to the first and last address location 418 that are earmarked for receiving data entries prior to a bin being determined to be full. Once the bin is determined to be full (e.g., once the address locations between the first bin boundary 431-1 and the second bin boundary 431-2 contain data entries or at least a threshold quantity of data entries, the first bin boundary 431-1 and the second bin boundary 431-2 can be relocated thereby designating a bin of available address locations 418 within the memory device 416.

For example, the center entry 424 can correspond to a first data entry that is written to the memory bank 416, e.g., a data entry that is written to an address location, in this case the address location 418-6, that is equidistant from a first physical address 418-1 and a last physical address 418-N. Embodiments are not so limited, however, and the enter entry 424 can correspond to a first data entry that is written to the memory bank 416 at an address location that is equidistant from the lower pointer 427 and the upper pointer 429. In some embodiments, the pointer 425 can be assigned to this address location to indicate where the center address location 418 is located in the memory bank 416. Stated alternatively, in general, the pointer 425 is associated to an address location 418 as opposed to a data entry. This can allow for a determination to be made as to whether a particular data entry is written to an upper portion of the data structure (e.g., between the pointer 425 and the upper pointer 429) or to a lower portion of the data structure (e.g., between the pointer 425 and the lower pointer 427), thereby reducing an amount of time that would be consumed if the entire data structure was searched.

The lower pointer 427 can be assigned to an address location in which the lower entry 428, e.g., the data entry that, for an ordered ascending data structure (e.g., the data structure 225 illustrated in FIG. 2 and/or the data structure 325 illustrated in FIGS. 3A-3H, herein) has a lowest value and is therefore physically closest to the first physical address 418-1, is written. Similarly, the upper pointer 429 can be assigned to an address location in which the upper entry 428, e.g., the data entry that, for an ordered ascending data structure has a highest value and is therefore physically closest to the last physical address 418-N, is written.

The pointers 425, 427, and 429 can be dynamically moved as the memory bank 416 is filled with data entries. For example, the pointer 425 can be moved to align with the center entry 424 (e.g., with the data entry that is equidistant from the upper entry 426 and the lower entry 428), while the lower pointer 427 and the upper pointer 429 can, for an ordered ascending data structure, be moved to align with the data entry that has the lowest numerical value and the data entry that has the highest numerical value, respectively. It will be appreciated that, for an ordered descending data structure, the lower pointer 427 and the upper pointer 429 can be moved to align with the data entry that has the lowest numerical value and the data entry that has the highest numerical value, respectively.

The pointers 425, 427, and 429 can be used in connection with determining an address location 418 in the data structure to write data entries. For example, the pointer 427 can be checked to determine a numerical value of a data entry written to the address location associated with the lower entry 426 to determine if a data entry that is to be written to the memory bank 416 has a greater numerical value or a lesser numerical value than the value of the data entry written to the address location associated with the lower entry 426. If the numerical value of the data entry that is to be written to the memory bank 416 is less than the numerical value of the data entry written to the address location associated with the lower entry 426, the data entry that is to be written to the memory bank 416 can be written to an address location that is physically closer to the first physical address of the memory resource (for an ordered ascending data structure) and the pointer 427 can be moved to point to the newly written data entry.

Similarly, the pointer 429 can be checked to determine a numerical value of a data entry written to the address location associated with the upper entry 428 to determine if a data entry that is to be written to the memory bank 416 has a greater numerical value or a lesser numerical value than the value of the data entry written to the address location associated with the upper entry 428. If the numerical value of the data entry that is to be written to the memory bank 416 is greater than the numerical value of the data entry written to the address location associated with the upper entry 428, the data entry that is to be written to the memory bank 416 can be written to an address location that is physically closer to the last physical address of the memory resource (for an ordered ascending data structure) and the pointer 429 can be moved to point to the newly written data entry.

In general, the bin boundaries 431-1 and 431-2 can be used to demarcate a region (set of address locations) in the memory bank(s) 416 to which data entries can be written in accordance with the disclosure while the pointers 427 and 429 can be used to demarcate a section of the memory bank 416 to which data entries are already written. For example, if there are four memory banks as shown above in connection with FIGS. 3A-3H, and each memory bank contains two thousand and forty-eight (2,048) address locations, the bin boundaries 431-1 and 431-2 may be set such that each of the memory banks has five hundred and twelve (512) available address locations at a time to write data entries to such that the data structure (e.g., the data structure 225/325 illustrated in FIG. 2 and FIGS. 3A-3H) contains two thousand and forty-eight (2,048) total address locations. In this manner, once the data structure has been compacted, the bin boundaries 431-1 and 431-2 can be relocated to allow access to a second portion of the memory banks for writing of data entries.

Figure 5:
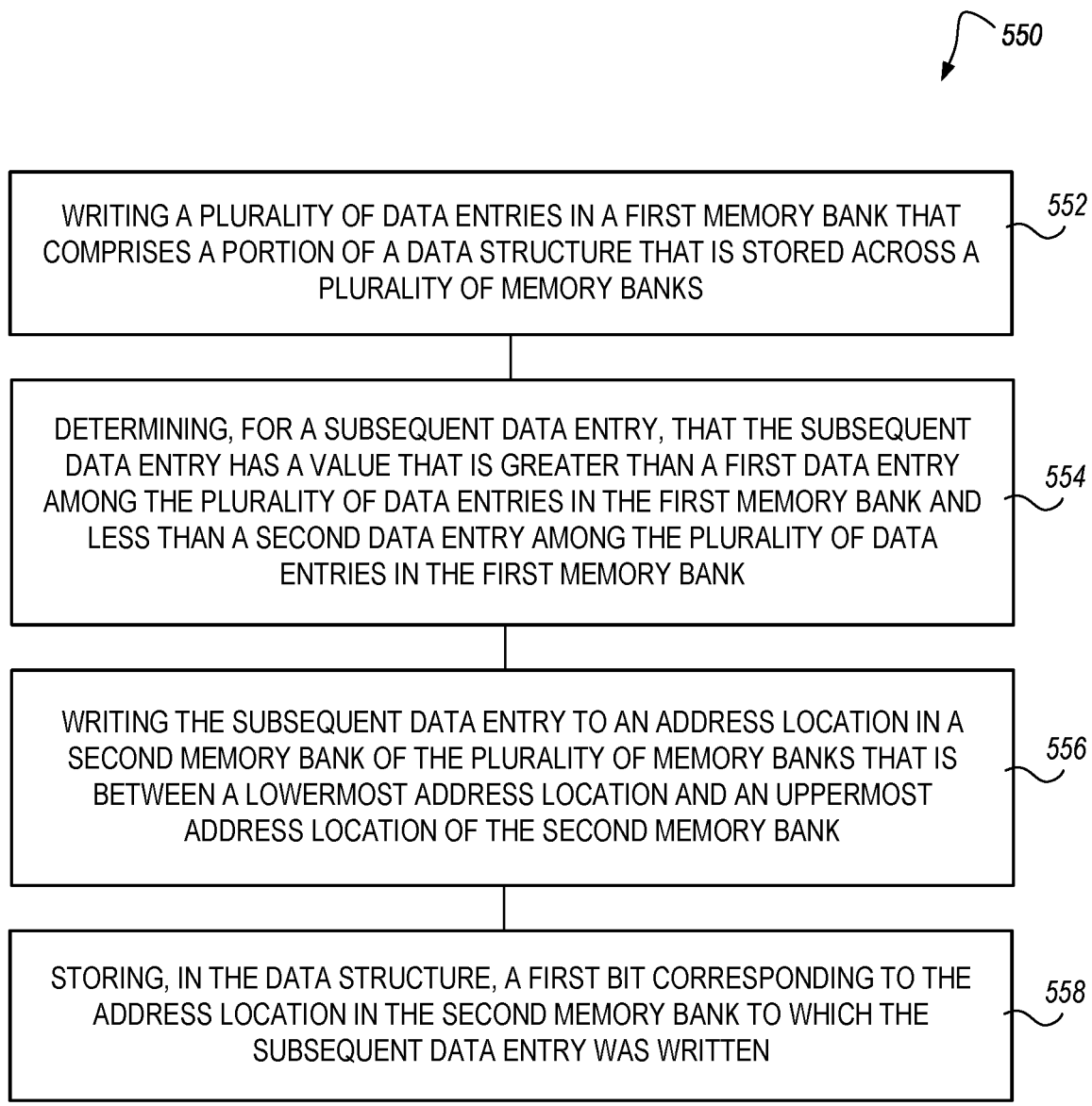
FIG. 5 is a flow diagram corresponding to a method for a scheme for data entry insertion in a sparsely populated data structure in accordance with some embodiments of the present disclosure.

FIG. 5 is a flow diagram corresponding to a method 550 for a scheme for data entry insertion in a sparsely populated data structure in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the data entry insertion circuitry 113 of FIG. 1 and/or the data entry insertion circuitry 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, the method 550 includes writing a plurality of data entries in a first memory bank that comprises a portion of a data structure that is stored across a plurality of memory banks (e.g., the plurality of memory banks 216/316 illustrated in FIG. 2 and FIGS. 3A-3H). The first memory bank can be analogous to the memory bank 216-0/316-0 illustrated in FIG. 2 and FIGS. 3A-3H and the data structure can be analogous to the data structure 225/325 illustrated in FIG. 2 and FIGS. 3A-3H.

In some embodiments, as described in more detail above, the method 550 includes writing the plurality of data entries to the first memory bank by (1) writing a first data entry to the first memory bank in an address location that is between a lowermost address location and an uppermost address location of the first memory bank, (2) determining that a second data entry has a data value that is lower than a data value associated with the first data entry, and (3) writing the second data entry to an address location of the first memory bank that is between the address location to which the first data entry is written and the lowermost address location. Embodiments are not so limited, and the method 550 can, in the alternative, include (1) determining that the second data entry has a data value that is greater than the data value associated with the first data entry and (2) writing the second data entry to an address location of the first memory bank that is between the address location to which the first data entry is written and the uppermost address location.

At operation 554, the method 550 includes determining, for a subsequent data entry, that the subsequent data entry has a value that is greater than a first data entry among the plurality of data entries in the first memory bank and less than a second data entry among the plurality of data entries in the first memory bank. For example, the method 550 can include determining that, in the non-limiting example shown in FIGS. 3A-3H, that the $6^{th}$ data entry (which can be analogous to the "subsequent data entry" in this example) has a value that is greater than $1^{st}$ data entry and less than the $3^{rd}$ data entry or is greater than the $3^{rd}$ data entry and less than the $5^{th}$ data entry.

At operation 556, the method 550 includes writing the subsequent data entry to an address location in a second memory bank of the plurality of memory banks that is between a lowermost address location and an uppermost address location of the second memory bank (e.g., the memory bank 316-2 of FIGS. 3A-3H). In keeping with the non-limiting example described above in connection with FIGS. 3A-3H, the $6^{th}$ data entry (e.g., the "subsequent data entry") can be written to the memory bank 316-2 in an address location in the row 324-4, which is between a lowermost address location and an uppermost address location in the second memory bank. For example, in some embodiments, the method 550 includes writing the subsequent data entry to the address location in the second memory bank among the plurality of memory banks that is in a row (e.g., one of the rows 324 illustrated in FIGS. 3A-3H) that spans the plurality of memory banks where the first data entry among the plurality of data entries in the first memory bank or the second data entry among the plurality of data entries in the first memory bank are in the row that spans the plurality of memory banks.

At operation 558, the method 550 includes storing, in the data structure, a first bit corresponding to the address location in the second memory bank to which the subsequent data entry was written. The "first bit" can be a bit in the indicator 317 illustrated and discussed above in connection with FIGS. 3A-3H. For example, when the subsequent data entry is written to the memory bank 316-2 of FIGS. 3A-3H, the method 550 can update the indicator 317 from a value of "000" to a value of "010."

In some embodiments, the method 550 can include determining, for a further subsequent data entry, that the further subsequent data entry has a value corresponding thereto that is greater than a data entry among the plurality of data entries in the first memory bank and less than a value associated with the subsequent data entry. The "further subsequent data entry" (or entries) can be data entries that are written in accordance with FIGS. 3C-3H and are described in detail above in connection with these figures. The method 550 can further include writing the further subsequent data entry to an address location in a third memory bank of the plurality of memory banks that is in a row that spans the plurality of memory banks, where the data entry among the plurality of data entries in the first memory bank and the subsequent data entry are in the row that spans the plurality of memory banks. In such embodiments, the method 550 can further include storing, in the data structure, a second bit corresponding to the address location in the third memory bank to which the further subsequent data entry was written.

Similarly, in some embodiments, the method 550 can include determining, for a further subsequent data entry, that the further subsequent data entry has a value corresponding thereto that is less than a data entry among the plurality of data entries in the first memory bank and greater than a value associated with the subsequent data entry. The "further subsequent data entry" (or entries) can be data entries that are written in accordance with FIGS. 3C-3H and are described in detail above in connection with these figures. In these embodiments, the method 550 can include writing the further subsequent data entry to an address location in a fourth memory bank of the plurality of memory banks that is in a row that spans the plurality of memory banks, where the data entry among the plurality of data entries in the first memory bank and the subsequent data entry are in the row that spans the plurality of memory banks. In such embodiments, the method 550 can include storing, in the data structure, a second bit corresponding to the address location in the fourth memory bank to which the further subsequent data entry was written.

The method 550 can further include determining that the data structure is full (as described above) when a data entry is written to a threshold quantity of address locations associated with the data structure and performing an operation to compact the data entries written to the data structure within the plurality of memory banks as described above in connection with FIG. 3H. Embodiments are not so limited, and, as described above, the method 550 can include determining that the data structure is full when a data entry is written to a threshold quantity of address locations in each of the plurality of memory banks and writing the data structure to a virtual memory area couplable to the plurality of memory banks. In this context, writing the data structure to the virtual memory area can comprise readdressing a portion of a memory space associated with the plurality of memory banks as a "virtual address space" without rewriting each data entry in the data structure to a different physical address location within the plurality of memory banks. Although discussed above in terms of implementations in which there are four (4) memory banks, it will be understood that the disclosure is applicable to implementations that include any number of memory banks greater than (e.g., 6 memory banks, 8 memory banks, 16 memory banks, etc.) or fewer than (e.g., 2 memory banks, etc.) four memory banks.

Figure 6:
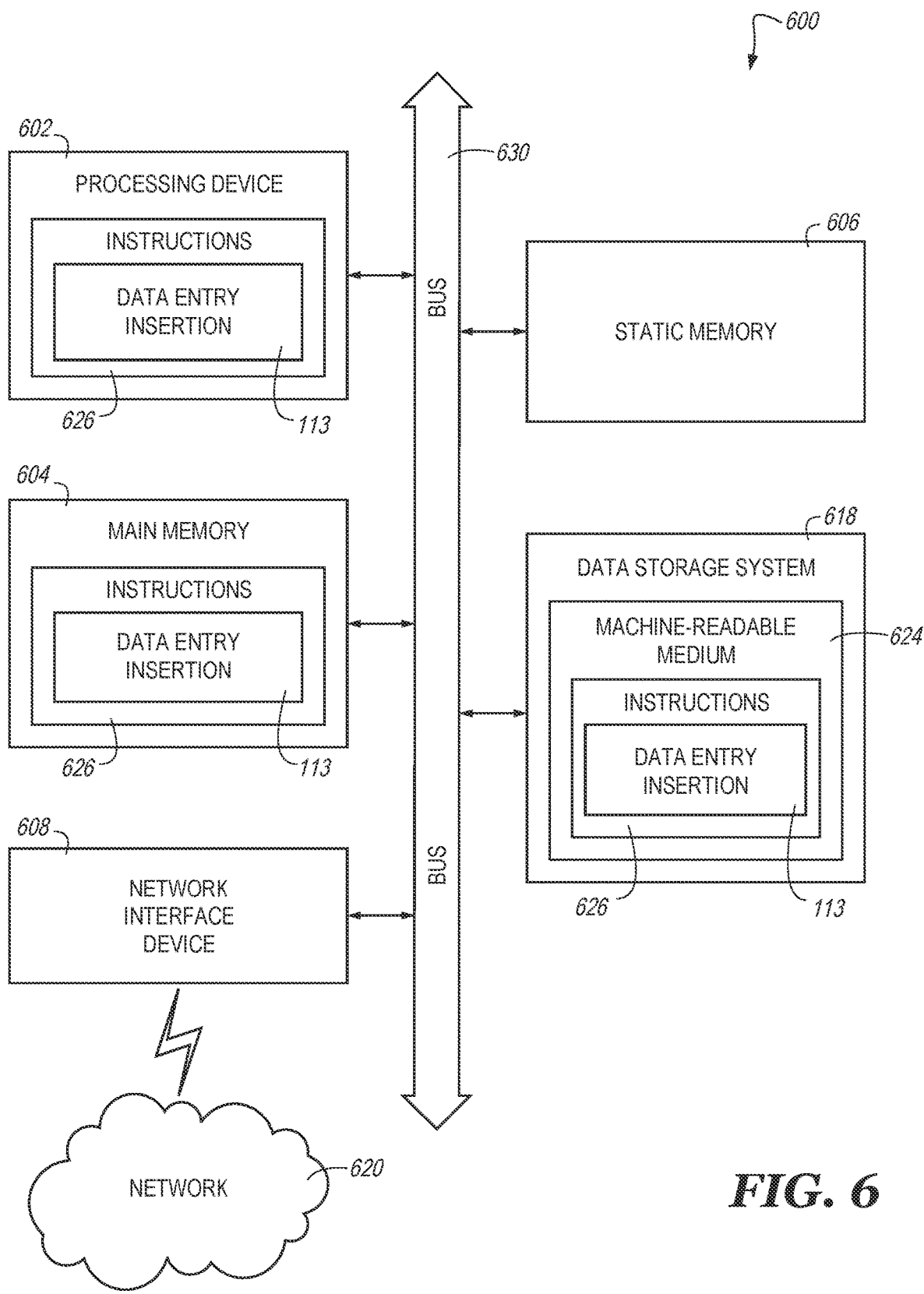
FIG. 6 is a block diagram of an example computer system in which embodiments of the present disclosure may operate.
Figure 7:
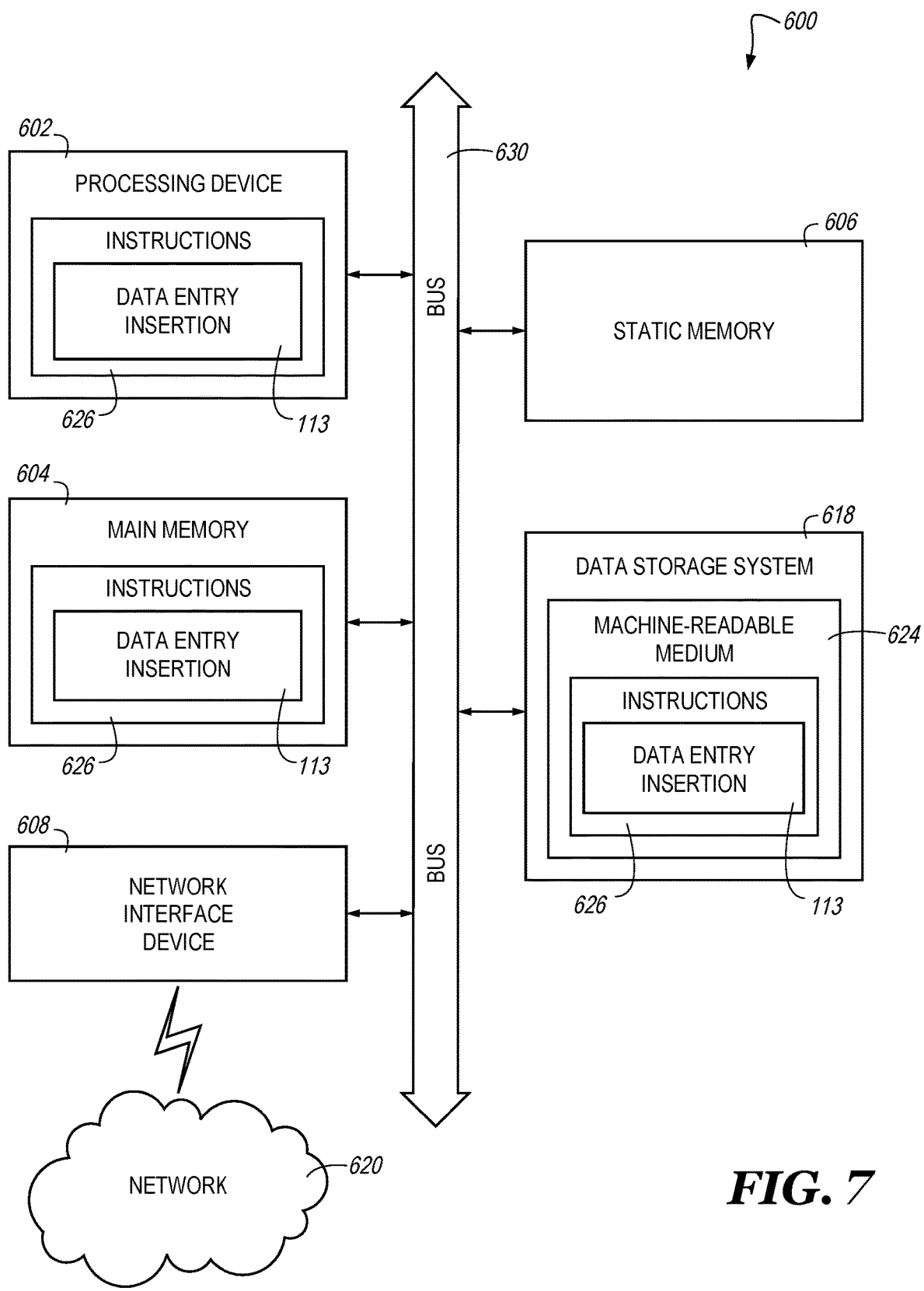

FIG. 6 is a block diagram of an example computer system in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data entry insertion circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. In some embodiments, the processing device 602 is analogous to the data entry insertion circuitry 113/213 of FIG. 1 and/or FIG. 2. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to data entry insertion circuitry (e.g., the data entry insertion circuitry 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method, comprising:
writing a plurality of data entries in a first memory bank that comprises a portion of a data structure that is stored across a plurality of memory banks;
determining, for a subsequent data entry, that the subsequent data entry has a value that is greater than a first data entry among the plurality of data entries in the first memory bank and less than a second data entry among the plurality of data entries in the first memory bank;
writing the subsequent data entry to an address location in a second memory bank of the plurality of memory banks that is between a lowermost address location and an uppermost address location of the second memory bank and in a row that spans the plurality of memory banks, wherein the first data entry among the plurality of data entries in the first memory bank or the second data entry among the plurality of data entries in the first memory bank are in the row that spans the plurality of memory banks; and
storing, in the data structure, a first bit corresponding to the address location in the second memory bank to which the subsequent data entry was written.

2. The method of claim 1, further comprising writing the plurality of data entries to the first memory bank by:
writing a first data entry to the first memory bank in an address location that is between a lowermost address location and an uppermost address location of the first memory bank;
determining that a second data entry has a data value that is lower than a data value associated with the first data entry; and
writing the second data entry to an address location of the first memory bank that is between the address location to which the first data entry is written and the lowermost address location, or determining that the second data entry has a data value that is greater than the data value associated with the first data entry; and
writing the second data entry to an address location of the first memory bank that is between the address location to which the first data entry is written and the uppermost address location.

3. The method of claim 1, further comprising:
determining that the data structure is full when a data entry is written to a threshold quantity of address locations associated with the data structure; and
performing an operation to compact the data entries written to the data structure within the plurality of memory banks.

4. The method of claim 1, further comprising:
determining that the data structure is full when a data entry is written to a threshold quantity of address locations in each of the plurality of memory banks; and
writing the data structure to a virtual memory area couplable to the plurality of memory banks.

5. The method of claim 1, further comprising:
determining, for a further subsequent data entry, that the further subsequent data entry has a value corresponding thereto that is greater than a data entry among the plurality of data entries in the first memory bank and less than a value associated with the subsequent data entry;
writing the further subsequent data entry to an address location in a third memory bank of the plurality of memory banks that is in the row that spans the plurality of memory banks, wherein the data entry among the plurality of data entries in the first memory bank and the subsequent data entry are in the row that spans the plurality of memory banks; and
storing, in the data structure, a second bit corresponding to the address location in the third memory bank to which the further subsequent data entry was written.

6. The method of claim 1, further comprising:
determining, for a further subsequent data entry, that the further subsequent data entry has a value corresponding thereto that is less than a data entry among the plurality of data entries in the first memory bank and greater than a value associated with the subsequent data entry;
writing the further subsequent data entry to an address location in a fourth memory bank of the plurality of memory banks that is in the row that spans the plurality of memory banks, wherein the data entry among the plurality of data entries in the first memory bank and the subsequent data entry are in the row that spans the plurality of memory banks; and
storing, in the data structure, a second bit corresponding to the address location in the fourth memory bank to which the further subsequent data entry was written.

7. An apparatus, comprising:
a plurality of memory banks configured to store a data structure; and
a processing device coupled to the plurality of memory banks, wherein the processing device is configured to:
write a plurality of data entries in a first memory bank of the plurality of memory banks;
determine, for a subsequent data entry to be written to the data structure, that the subsequent data entry has a value corresponding thereto that is greater than a first particular data entry among the plurality of data entries written to the first memory bank and less than a second particular data entry among the plurality of data entries written to the first memory bank;
write the subsequent data entry to an address location in a second memory bank of the plurality of memory banks that is between a lowermost address location and an uppermost address location of the second memory bank, wherein the address location in the second memory bank corresponds to a same row address as a row address of the first particular data entry in the first memory bank or a same row address as a row address of the second particular data entry in the first memory bank; and
store, in the data structure, a bit corresponding to the address location in the second memory bank to which the subsequent data entry was written.

8. The apparatus of claim 7, wherein the processing device is further configured to:
determine, for a further subsequent data entry, that the further subsequent data entry has a value corresponding thereto that is greater than a data entry among the plurality of data entries in the first memory bank and less than a value associated with the subsequent data entry;
write the further subsequent data entry to an address location in a third memory bank of the plurality of memory banks that is in the row that spans the plurality of memory banks, wherein the data entry among the plurality of data entries in the first memory bank and the subsequent data entry are in the row that spans the plurality of memory banks; and
store, in the data structure, a second bit corresponding to the address location in the third memory bank to which the further subsequent data entry was written.

9. The apparatus of claim 7, wherein the processing device is further configured to:
  determine, for a further subsequent data entry, that the further subsequent data entry has a value corresponding thereto that is less than a data entry among the plurality of data entries in the first memory bank and greater than a value associated with the subsequent data entry;
  write the further subsequent data entry to an address location in a fourth memory bank of the plurality of memory banks that is in the row that spans the plurality of memory banks, wherein the data entry among the plurality of data entries in the first memory bank and the subsequent data entry are in the row that spans the plurality of memory banks; and
  store, in the data structure, a second bit corresponding to the address location in the fourth memory bank to which the further subsequent data entry was written.

10. The apparatus of claim 7, wherein:
  the plurality of memory banks comprises four memory banks, and
  each of the memory banks are configured to store at least 512 data entries.

11. The apparatus of claim 7, wherein the processing device is configured to:
  determine that the data structure is full when a data entry is written to a threshold quantity of address locations in each of the plurality of memory banks; and
  write data entries subsequent to determining that the data structure is full to at least one additional memory bank that is separate from the plurality of memory banks.

12. The apparatus of claim 7, wherein the processing device is configured to:
  determine that the data structure is full when a data entry is written to each address location in each of the plurality of memory banks; and
  write the data structure to a virtual memory area couplable to the plurality of memory banks.

13. An apparatus, comprising:
  a memory device that includes a plurality of memory banks, wherein each memory bank among the plurality of memory banks is configured to store at least a portion of a data structure that is stored across the plurality of memory banks; and
  a processing device coupled to the memory device, wherein the processing device is configured to:
    write a plurality of data entries in a first memory bank that comprises the portion of the data structure by:
      writing a first data entry to the first memory bank in an address location that is between a lowermost address location and an uppermost address location of the first memory bank;
      determining that a second data entry has a data value that is lower than a data value associated with the first data entry; and
      writing the second data entry to an address location of the first memory bank that is between the address location to which the first data entry is written and the lowermost address location, or
      determining that the second data entry has a data value that is greater than the data value associated with the first data entry; and
      writing the second data entry to an address location of the first memory bank that is between the address location to which the first data entry is written and the uppermost address location;
    determine, for a subsequent data entry to be written to the data structure, that the subsequent data entry has a value corresponding thereto that is between the first data entry and the second data entry written to the first memory bank;
    write the subsequent data entry to an address location in a second memory bank of the plurality of memory banks that is in a row that is a same row that spans the plurality of memory banks as the first data entry or the second data; and
    store, in the data structure, a bit corresponding to the address location in the second memory bank to which the subsequent data entry was written.

14. The apparatus of claim 13, wherein the processing device is further configured to:
  determine, for a further subsequent data entry, that the further subsequent data entry has a value corresponding thereto that is between the first data entry or the second data entry and subsequent data entry;
  write the further subsequent data entry to an address location in a third memory bank of the plurality of memory banks that is in the row that is the same row that spans the plurality of memory banks as the first data entry or the second data and the subsequent data entry; and
  store, in the data structure, a second bit corresponding to the address location in the third memory bank to which the further subsequent data entry was written.

15. The apparatus of claim 13, wherein the processing device is configured to write data entries to the data structure such that the data entries are numerically ordered.

16. The apparatus of claim 13, wherein the processing device is configured to write the plurality of data entries and the subsequent data entry to the plurality of memory banks to reduce an amount of power consumed or a latency incurred within a system in which the apparatus is deployed.

17. The apparatus of claim 13, wherein:
  the plurality of memory banks comprises four memory banks, and
  each of the memory banks are configured to store at least 512 data entries.

18. The apparatus of claim 17, wherein the processing device is further configured to:
  determine that the data structure is full when a data entry is written to each address location associated with the data structure; and
  perform an operation to compact the data entries written to the data structure within the plurality of memory banks.

19. A method, comprising:
  writing a plurality of data entries in a first memory bank that comprises a portion of a data structure that is stored across a plurality of memory banks;
  determining, for a subsequent data entry, that the subsequent data entry has a value that is greater than a first data entry among the plurality of data entries in the first memory bank and less than a second data entry among the plurality of data entries in the first memory bank;
  writing the subsequent data entry to an address location in a second memory bank of the plurality of memory banks that is between a lowermost address location and an uppermost address location of the second memory bank;
  storing, in the data structure, a first bit corresponding to the address location in the second memory bank to which the subsequent data entry was written;
  determining that the data structure is full when a data entry is written to a threshold quantity of address locations associated with the data structure; and performing an operation to compact the data entries written to the data structure within the plurality of memory banks.

20. An apparatus, comprising:
a plurality of memory banks configured to store a data structure; and
a processing device coupled to the plurality of memory banks, wherein the processing device is configured to:
write a plurality of data entries in a first memory bank of the plurality of memory banks;
determine, for a subsequent data entry to be written to the data structure, that the subsequent data entry has a value corresponding thereto that is greater than a first particular data entry among the plurality of data entries written to the first memory bank and less than a second particular data entry among the plurality of data entries written to the first memory bank;
write the subsequent data entry to an address location in a second memory bank of the plurality of memory banks that is between a lowermost address location and an uppermost address location of the second memory bank; and
store, in the data structure, a bit corresponding to the address location in the second memory bank to which the subsequent data entry was written;
wherein the processing device is further configured to:
determine, for a further subsequent data entry, that the further subsequent data entry has a value corresponding thereto that is greater than a data entry among the plurality of data entries in the first memory bank and less than a value associated with the subsequent data entry; or
determine that the further subsequent data entry has a value corresponding thereto that is less than a data entry among the plurality of data entries in the first memory bank and greater than a value associated with the subsequent data entry;
write the further subsequent data entry to an address location in a third memory bank of the plurality of memory banks that is in a row that spans the plurality of memory banks, wherein the data entry among the plurality of data entries in the first memory bank and the subsequent data entry are in the row that spans the plurality of memory banks; and
store, in the data structure, a second bit corresponding to the address location in the third memory bank to which the further subsequent data entry was written.

\* \* \* \* \*